US012804610B2

(12) United States Patent
Hong et al.

(10) Patent No.: US 12,804,610 B2

(45) Date of Patent: Nov. 17, 2026

(54) METHOD AND DEVICE FOR GENERATION AND TRANSMISSION OF INTER-UE COORDINATION INFORMATION IN SIDELINK COMMUNICATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Iksan-si (KR)

(73) Assignees: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 335 days.

(21) Appl. No.: 18/424,073

(22) Filed: Jan. 26, 2024

(65) Prior Publication Data

US 2024/0244586 A1 Jul. 18, 2024

Related U.S. Application Data

(63) Continuation of application No. PCT/KR2022/011404, filed on Aug. 2, 2022.

(30) Foreign Application Priority Data

Aug. 4, 2021 (KR) ........................ 10-2021-0102806

(51) Int. Cl.

*H04W 72/02* (2009.01)
*H04W 72/25* (2023.01)
*H04W 72/563* (2023.01)

(52) U.S. Cl.

CPC ........... *H04W 72/02* (2013.01); *H04W 72/25* (2023.01); *H04W 72/563* (2023.01)

(58) Field of Classification Search

CPC .... H04W 72/02; H04W 72/25; H04W 72/563
See application file for complete search history.

(56) References Cited

U.S. PATENT DOCUMENTS 12,127,199 B2 * 10/2024 Hosseini ........... H04W 72/1263
2015/0119056 A1 * 4/2015 Lee ..................... H04W 56/002 455/450

(Continued)

FOREIGN PATENT DOCUMENTS

| | | | | |
|---|---|---|---|---|
| CN | 112333661 A | 2/2021 | | |
| EP | 4 236 534 A1 | 8/2023 | | |
| WO | WO-2022159346 A2 * | 7/2022 | ............ | H04W 72/20 |

OTHER PUBLICATIONS

Extended European Search Report issued in corresponding European Application No. 22853429.3 dated Jun. 6, 2025.

(Continued)

*Primary Examiner* — Jael M Ulysse

(74) *Attorney, Agent, or Firm* — Morgan, Lewis & Bockius LLP

(57) ABSTRACT

A method and a device for generation and transmission of inter-UE coordination information in sidelink communication are disclosed. A method by a first UE includes the steps of: receiving, from a second UE, a first signaling message A indicating a request for transmission of inter-UE coordination information A; receiving, from a third UE, a first signaling message B indicating a request for transmission of inter-UE coordination information B; selecting one first (Continued)

signaling message having a higher priority from among the first signaling message A and the first signaling message B; generating inter-UE coordination information on the basis of a request for transmission of the one first signaling message; and transmitting a second signaling message including the generated inter-UE coordination information.

18 Claims, 5 Drawing Sheets

(56) References Cited

U.S. PATENT DOCUMENTS

| | | | | |
|---|---|---|---|---|
| 2021/0227620 | A1 | 7/2021 | Pan et al. | |
| 2022/0046602 | A1* | 2/2022 | Hosseini | H04W 72/02 |
| 2022/0167345 | A1* | 5/2022 | Jeong | H04W 72/54 |
| 2022/0240265 | A1* | 7/2022 | Sarkis | H04W 72/56 |
| 2022/0417919 | A1* | 12/2022 | Shin | H04W 72/40 |
| 2023/0147699 | A1* | 5/2023 | Park | H04W 72/1263<br>370/329 |
| 2023/0389002 | A1* | 11/2023 | Hui | H04L 5/0064 |
| 2023/0389051 | A1* | 11/2023 | Leon Calvo | H04W 72/02 |
| 2024/0204959 | A1* | 6/2024 | Ji | H04W 72/02 |

OTHER PUBLICATIONS

Fujitsu: "Considerations on Inter-UE Coordination for Mode 2 Enhancements", 3GPP Tsg Ran Meeting #103, WG1, #103-E, e-Meeting, Oct. 26-Nov. 13, 2020, R1-2007788; 19 pages.

International Search Report dated Nov. 4, 2022 cited in International Patent Application No. PCT/KR2022/011404 (w/English translation).

LG Electronics, "Discussion on feasibility and benefits for mode 2 enhancements," 3GPP TSG RAN WG1 Meeting #104-e, R1-2101786, e-Meeting—Jan. 25 through Feb. 5, 2021.

Ericsson, "Feasibility and benefits of mode 2 enhancements for inter-UE coordation," 3GPP TSG-RAN WG1 Meeting #104-e, R1-2101804, Online—Jan. 26 through Feb. 5, 2021

Nokia, Nokia Shanghai Bell, "Inter-UE coordination in mode 2 sidelink resource allocation," 3GPP TSG RAN WG1 Meeting #105-e, R1-2104177, e-Meeting—May 10-27, 2021.

Robert Bosch GmbH, "Discussion on Inter-UE Coordination for Sidelink Mode-2," 3GPP TSG RAN WG1 Meeting #105-e, R1-2105881, e-Meeting—May 10-27, 2021.

* cited by examiner

METHOD AND DEVICE FOR GENERATION AND TRANSMISSION OF INTER-UE COORDINATION INFORMATION IN SIDELINK COMMUNICATION

CROSS-REFERENCE TO RELATED APPLICATION

The present application is a continuation-in-part of currently pending International Patent Application No. PCT/KR2022/011404, filed Aug. 2, 2022, which claims priority to Korean Patent Application Number 10-2021-0102806 filed Aug. 4, 2021, the entire contents of which are incorporated herein for all purposes by these references.

BACKGROUND OF THE INVENTION

Field of the Present Disclosure

The present disclosure relates to a sidelink communication technique, and more particularly, to a technique for generation and transmission of inter-user equipment (UE) coordination information.

Description of Related Art

A Fifth-Generation (5G) communication system (e.g., New Radio (NR) communication system) which uses a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g. C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g. C-V2X communications) may be performed based on sidelink communication technologies (e.g. Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g. periodic sidelink data) may be transmitted using the CG resources.

Meanwhile, sidelink communication may be performed based on a resource allocation (RA) mode 1 or RA mode 2. When the RA mode 1 is used, a base station may allocate resources for sidelink communication to a user equipment (UE), and the UE may perform sidelink communication using the resources allocated by the base station. When the RA mode 2 is used, the UE may determine resources for sidelink communication by performing a resource sensing operation and/or a resource selection operation, and may perform sidelink communication using the determined resources.

Power consumption by performing the resource sensing operation and/or resource selection operation may be large. In a UE with limited power capacity, a UE with limited resource sensing capability, and/or a UE with limited resource selection capability, the resource sensing operation and/or resource selection operation may not be performed normally. Additionally, the efficiency of resource allocation according to the RA mode 2 may be reduced due to a hidden node problem, exposed node problem, and/or half-duplex problem. To solve the above-described problem, methods for performing the resource sensing operation and/or resource selection operation based on assistance of nearby UEs are needed.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present disclosure are directed to providing a method and an apparatus for generation and transmission of inter-UE coordination information in sidelink communication.

A method of a first user equipment (UE), according to various exemplary embodiments of the present disclosure for achieving the above-described objective, may include: receiving, from a second UE, a first signaling message A indicating a transmission request for inter-UE coordination information A; receiving, from a third UE, a first signaling message B indicating a transmission request for inter-UE coordination information B; selecting one first signaling message with a higher priority among the first signaling message A and the first signaling message B; generating inter-UE coordination information based on the transmission request of the one first signaling message; and transmitting a second signaling message including the generated inter-UE coordination information.

The one first signaling message including resource information may be determined to have a higher priority among the first signaling message A and the first signaling message B, and resources indicated by the generated inter-UE coordination information included in the second signaling message may be determined within a resource region indicated by the resource information.

When the first signaling message A includes resource information A, the first signaling message B includes resource information B, and the resource information A and the resource information B are different resource information, the first signaling message A including the resource information A may be determined to have a higher priority than the first signaling message B including the resource information B.

When the resource information A is sensed resource information, the resource information B may be reserved resource information, and when the resource information A is reserved resource information, the resource information B may be sensed resource information.

The resource information A included in the first signaling message A may indicate a resource region A of a first size, the resource information B included in the first signaling message B may indicate a resource region B of a second size, the first size and the second size may be different sizes, and the first signaling message A including the resource information A indicating the resource region A of the first size may be determined to have a higher priority than the first signaling message B including the resource information B indicating the resource region B of the second size.

When a priority between the first signaling message A and the first signaling message B is determined based on sizes of resource regions indicated by resource information included in the first signaling message A and the first signaling message B, a first signaling message that does not include resource information may be determined to have a lower priority among the first signaling message A and the first signaling message B.

The selecting of the one first signaling message with a higher priority may be performed when resource regions indicated by the first signaling message A and the first signaling message B partially or completely overlap.

A second signaling message for another first signaling message with a lower priority among the first signaling message A and the first signaling message B may not be transmitted.

The method may further include: transmitting a second signaling message for another first signaling message with a lower priority among the first signaling message A and the first signaling message B, wherein preferred resource information included in the second signaling message for the one first signaling message with the higher priority may be indicated as non-preferred resource information in the second signaling message for another first signaling message with the lower priority, and non-conflicting resource information included in the second signaling message for the one first signaling message with the higher priority may be indicated as conflicting resource information in the second signaling message for another first signaling message with the lower priority.

A first UE, according to various exemplary embodiments of the present disclosure for achieving the above-described objective, may include: a processor; and a memory storing one or more instructions executable by the processor, and the one or more instructions may be executed to perform: receiving, from a second UE, a first signaling message A indicating a transmission request for inter-UE coordination information A; receiving, from a third UE, a first signaling message B indicating a transmission request for inter-UE coordination information B; selecting one first signaling message with a higher priority among the first signaling message A and the first signaling message B; generating inter-UE coordination information based on the transmission request of the one first signaling message; and transmitting a second signaling message including the generated inter-UE coordination information.

The one first signaling message including resource information may be determined to have a higher priority among the first signaling message A and the first signaling message B, and resources indicated by the generated inter-UE coordination information included in the second signaling message may be determined within a resource region indicated by the resource information.

When the first signaling message A includes resource information A, the first signaling message B includes resource information B, and the resource information A and the resource information B are different resource information, the first signaling message A including the resource information A may be determined to have a higher priority than the first signaling message B including the resource information B.

When the resource information A is sensed resource information, the resource information B may be reserved resource information, and when the resource information A is reserved resource information, the resource information B may be sensed resource information.

The resource information A included in the first signaling message A may indicate a resource region A of a first size, the resource information B included in the first signaling message B may indicate a resource region B of a second size, the first size and the second size may be different sizes, and the first signaling message A including the resource information A indicating the resource region A of the first size may be determined to have a higher priority than the first signaling message B including the resource information B indicating the resource region B of the second size.

When a priority between the first signaling message A and the first signaling message B is determined based on sizes of resource regions indicated by resource information included in the first signaling message A and the first signaling message B, a first signaling message that does not include resource information may be determined to have a lower priority among the first signaling message A and the first signaling message B.

The selecting of the one first signaling message with a higher priority may be performed when resource regions indicated by the first signaling message A and the first signaling message B partially or completely overlap.

A second signaling message for another first signaling message with a lower priority among the first signaling message A and the first signaling message B may not be transmitted.

The one or more instructions may be further executed to perform: transmitting a second signaling message for another first signaling message with a lower priority among the first signaling message A and the first signaling message B, wherein preferred resource information included in the second signaling message for the one first signaling message with the higher priority may be indicated as non-preferred resource information in the second signaling message for another first signaling message with the lower priority, and non-conflicting resource information included in the second signaling message for the one first signaling message with the higher priority may be indicated as conflicting resource information in the second signaling message for another first signaling message with the lower priority.

According to an exemplary embodiment of the present disclosure, a UE-A may receive a plurality of first signaling messages from a plurality of UE-Bs, select one first signaling message among the plurality of first signaling messages based on priorities, and generate and transmit a second signaling message (e.g., inter-UE coordination information) in response to the first signaling message. In the instant case, inter-UE coordination operations can be performed efficiently, and the performance of the communication system can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
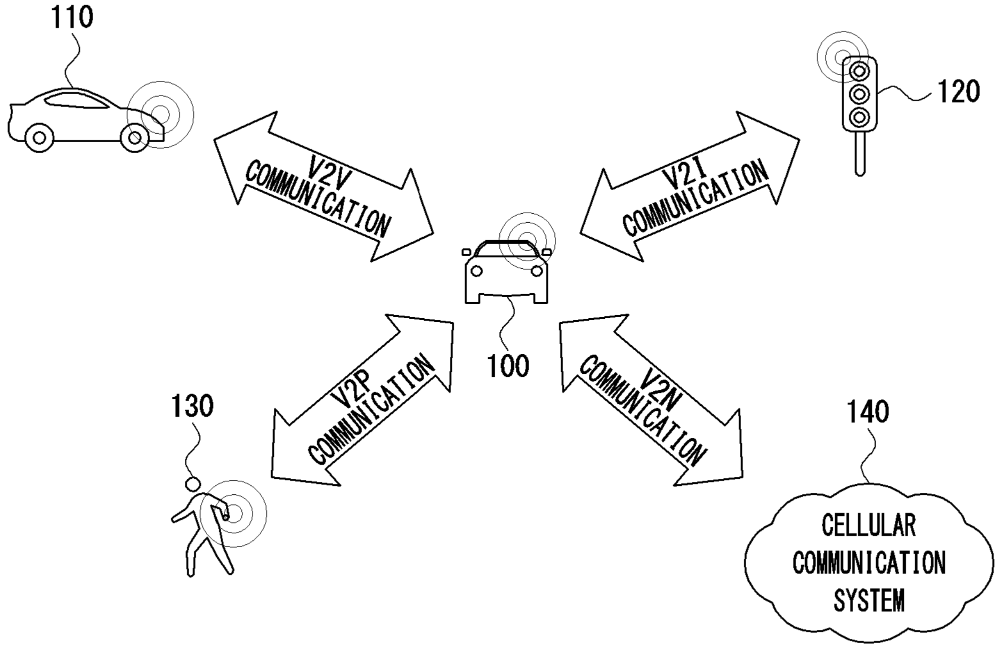
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g. a cellular communication system 140), and the V2X communications supported by the cellular communication system 140 may be referred to as "Cellular-V2X (C-V2X) communications." Here, the cellular communication system 140 may include the 4G communication system (e.g. LTE communication system or LTE-A communication system), 5G communication system (e.g. NR communication system), and the like.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g.

a cellular communication system 140), and the V2X communications supported by the cellular communication system 140 may be referred to as "Cellular-V2X (C-V2X) communications." Here, the cellular communication system 140 may include the 4G communication system (e.g. LTE communication system or LTE-A communication system), 5G communication system (e.g. NR communication system), 6G communication system, and the like.

The V2V communications may include communications between a first vehicle 100 (e.g. a communication node located in the vehicle 100) and a second vehicle 110 (e.g. a communication node located in the vehicle 110). Various driving information such as velocity, heading, time, position, and the like may be exchanged between the vehicles 100 and 110 through the V2V communications. For example, autonomous driving (e.g. platooning) may be supported based on the driving information exchanged through the V2V communications. The V2V communications supported in the cellular communication system 140 may be performed based on "sidelink" communication technologies (e.g. ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g. the communication node located in the vehicle 100) and an infrastructure (e.g. road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g. ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g. the communication node located in the vehicle 100) and a person 130 (e.g. a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g. ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g. the communication node located in the vehicle 100) and a server connected through the cellular communication system 140. The V2N communications may be performed based on the 4G communication technology (e.g. LTE or LTE-A) or the 5G communication technology (e.g. NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
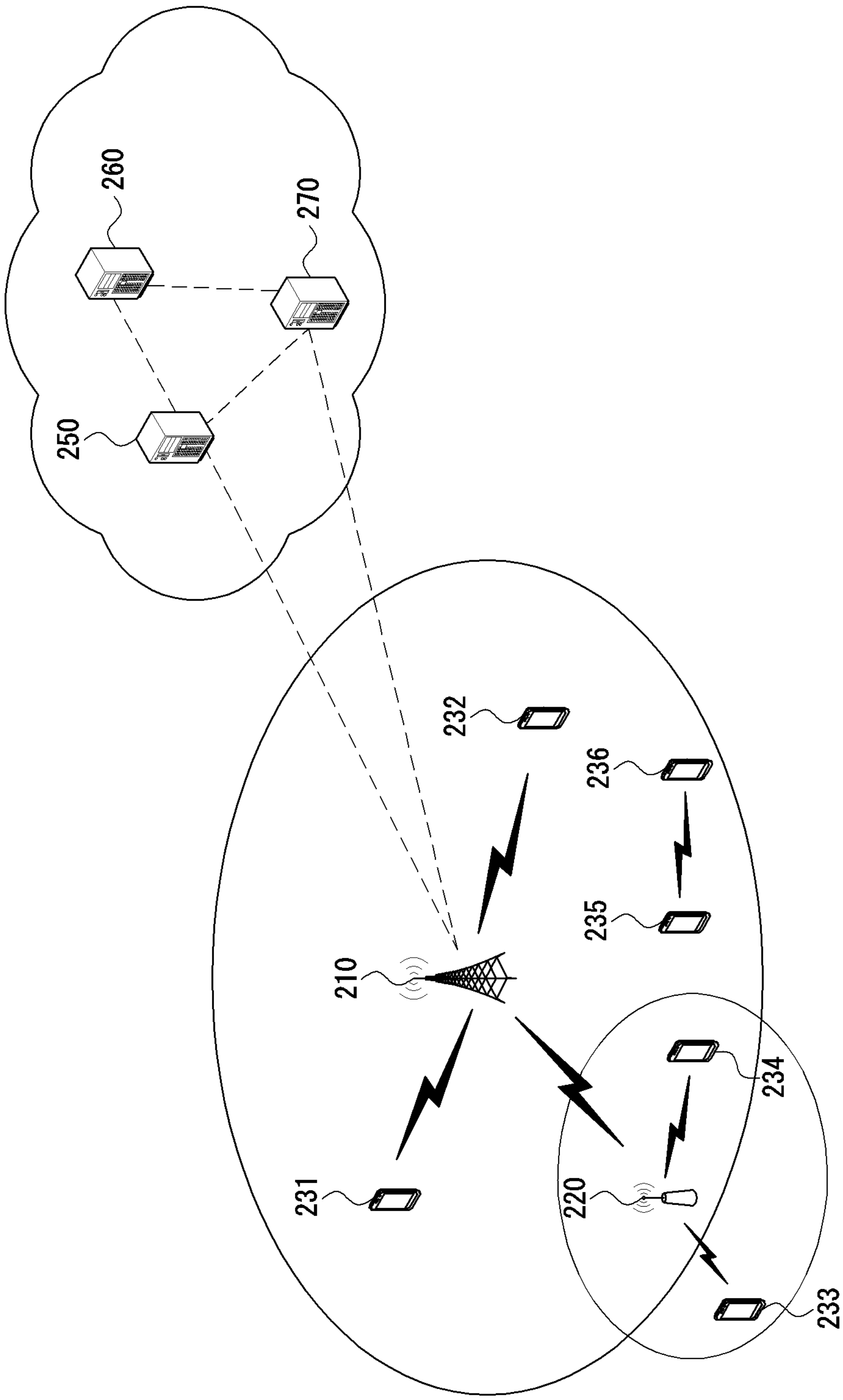
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g. a V2V network slice, a V2I network slice, a V2P network slice, a V2N network slice, etc.) may be configured, and the V2X communications may be supported through the V2X network slice configured in the core network.

The communication nodes (e.g. base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g. base station, relay, UE, S-GW, P-GW, MME, UPF, SMF, AMF, etc.) including the cellular communication system may be configured as follows.

Figure 3:
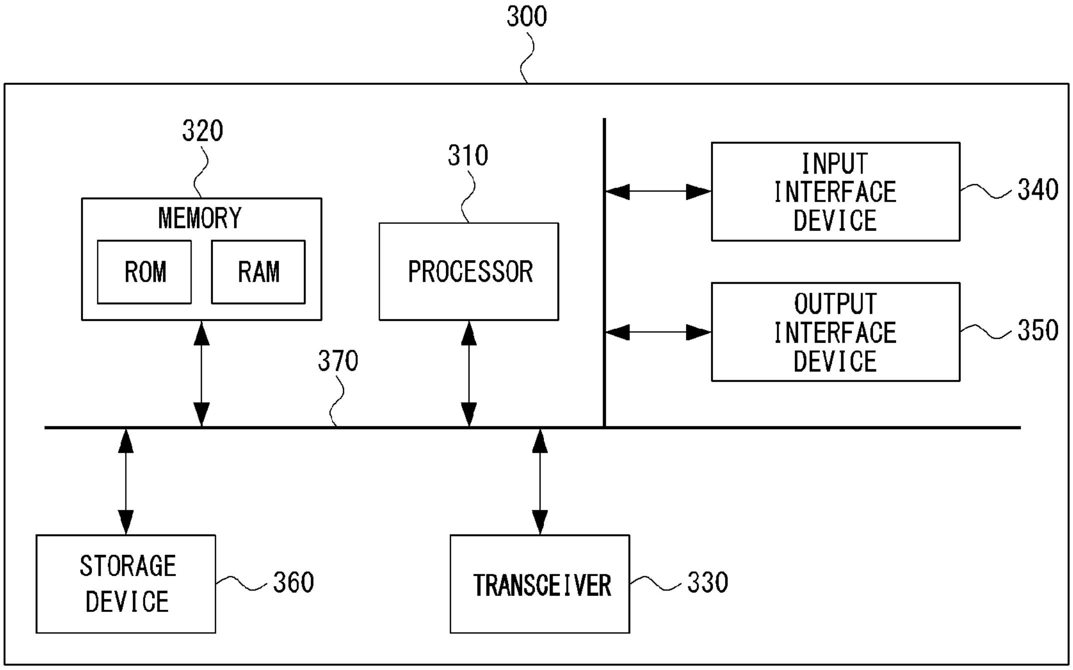
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g. single user (SU)-MIMO, multi-user (MU)-MIMO, massive MIMO, etc.), coordinated multipoint (COMP) communication technologies, carrier aggregation (CA) communication technologies, unlicensed band communication technologies (e.g. Licensed Assisted Access (LAA), enhanced LAA (eLAA), etc.), sidelink communication technologies (e.g. ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a NodeB (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g. the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g. the UEs 235 and 236) performing sidelink communications may be configured as follows.

Figure 4:
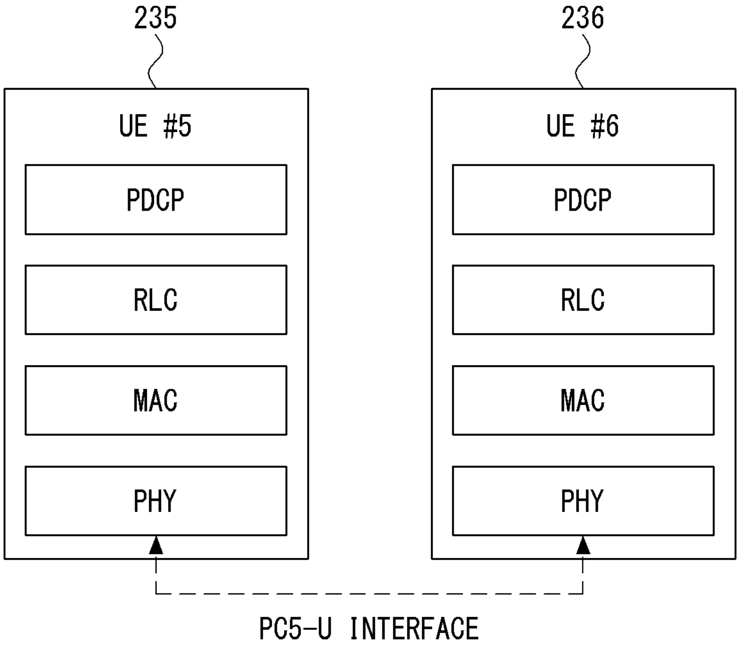
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g. PC5-U interface). A layer-2 identifier (ID) (e.g. a source layer-2 ID, a destination layer-2 ID) may be used for the sidelink communications, and the layer 2-ID may be an ID configured for the V2X communications (e.g. V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g. the UEs 235 and 236) performing sidelink communications may be configured as follows.

Figure 5:
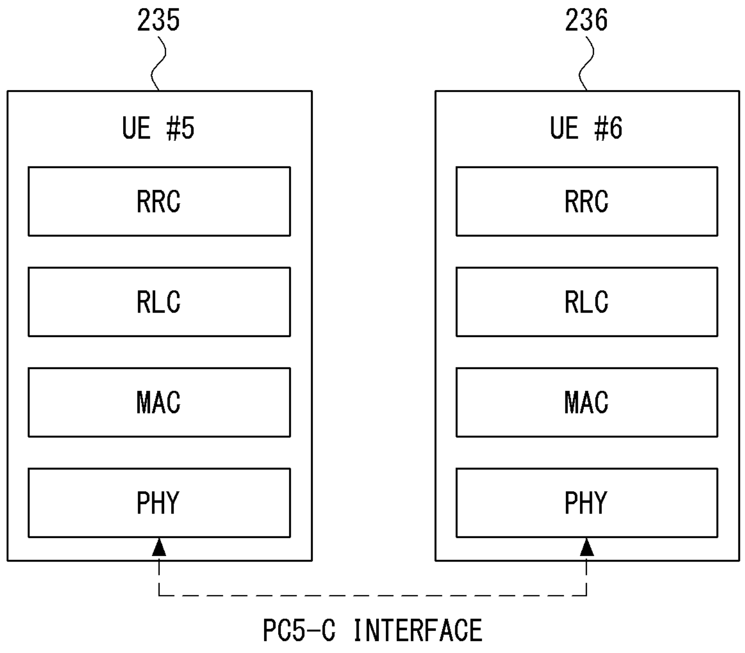
FIG. 5 is a block diagram illustrating various exemplary embodiments of a control plane protocol stack of a UE performing sidelink communication.
Figure 6:
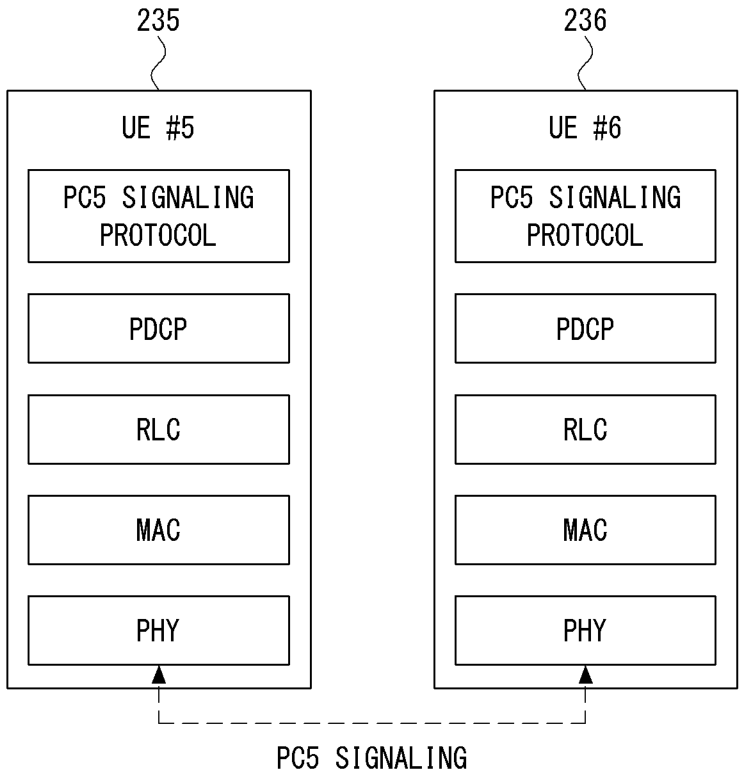
FIG. 6 is a block diagram illustrating various exemplary embodiments of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g. Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g. PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g. UE 235 or 236) by a higher layer signaling. The PSCCH may be used for transmitting and receiving sidelink control information (SCI) and may also be configured in the UE (e.g. UE 235 or 236) by a higher layer signaling.

The PSDCH may be used for a discovery procedure. For example, a discovery signal may be transmitted over the PSDCH. The PSBCH may be used for transmitting and receiving broadcast information (e.g. system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g. a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g. UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g. UE 235 or 236) within the resource pool configured by the dedicated RRC signaling procedure or the broadcast RRC signaling procedure.

Hereinafter, sidelink communication methods will be described. Even when a method (e.g. transmission or reception of a signal) to be performed at a first communication node among communication nodes is described, a corresponding second communication node may perform a method (e.g. reception or transmission of the signal) corresponding to the method performed at the first communication node. That is, when an operation of a UE #1 (e.g. vehicle #1) is described, a UE #2 (e.g. vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g. master information block (MIB), system information block (SIB)) and/or an RRC message. The MAC signaling may refer to an operation of transmitting and receiving a MAC control element (CE). The PHY signaling may refer to an operation of transmitting and receiving control information (e.g. downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g. sidelink data transmission, sidelink-shared channel (SL-SCH) transmission) may be performed based on one SCI (e.g. 1st-stage SCI). When the multi-SCI scheme is used, data transmission may be performed using two SCIs (e.g. 1st-stage SCI and 2nd-stage SCI). The SCI(s) may be transmitted on a PSCCH and/or a PSSCH. When the single-SCI scheme is used, the SCI (e.g. 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A, a SCI format 2-B, and a SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or providing inter-UE coordination information.

In exemplary embodiments, configuration of an operation (e.g. transmission operation) may mean that configuration information (e.g. information element(s), parameter(s)) for the operation and/or information indicating to perform the operation is signaled. Configuration of information element(s) (e.g. parameter(s)) may mean that the information element(s) are signaled. The signaling may be at least one of system information (SI) signaling (e.g. transmission of a system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). Here, the MAC CE signaling operation may be performed through a data channel, the PHY signaling operation may be performed through a control channel or a data channel, and transmission of SCI may mean transmission of first-stage SCI and/or second-stage SCI.

In exemplary embodiments, a UE-A may refer to a UE that transmits inter-UE coordination information to a UE-B. The UE-A may be referred to as a first UE or a second UE. The UE-A may transmit inter-UE coordination information to the UE-B according to an explicit request of the UE-B. Alternatively, the UE-A may transmit inter-UE coordination information to the UE-B when a condition(s) configured by higher layer signaling is satisfied. The UE-B may refer to a UE that receives inter-UE coordination information from the UE-A. The UE-B may be referred to as a first UE or a second UE. If a request procedure for inter-UE coordination information is enabled, the UE-B may transmit a request for inter-UE coordination information to the UE-A. If a request procedure for inter-UE coordination information is not enabled, the UE-B may receive inter-UE coordination information the from UE-A without requesting the inter-UE coordination information. That is, if a preconfigured condition(s) is satisfied in the UE-A, the UE-B may receive inter-UE coordination information from the UE-A.

Figure 7:
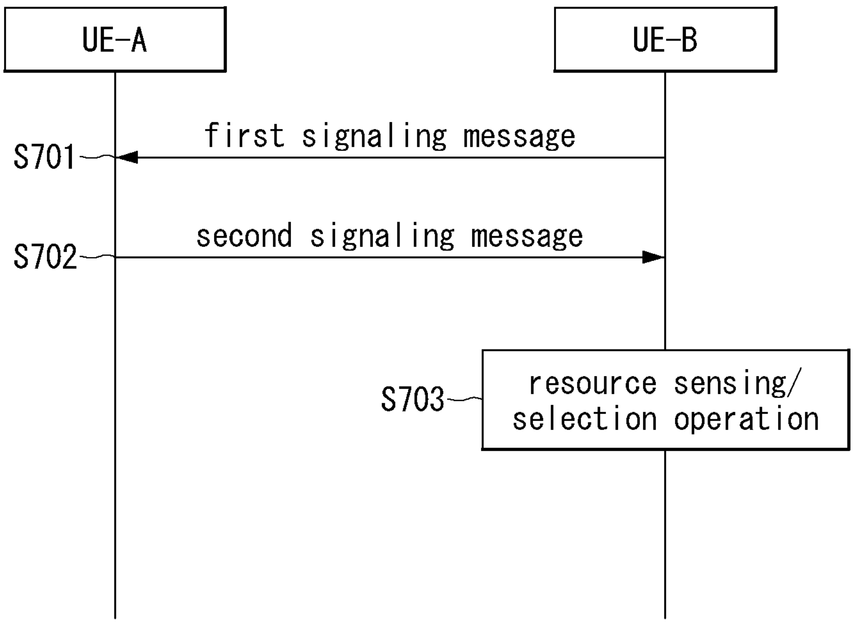
FIG. 7 is a sequence chart illustrating various exemplary embodiments of a sidelink communication method.

FIG. 7 is a sequence chart illustrating a first exemplary embodiment of a sidelink communication method.

As shown in FIG. 7, a communication system may include a UE-A and UE-B, and sidelink communication may be performed based on the resource allocation (RA) mode 2. The RA mode 2 may be the sidelink TM 2 or 4 specified in Table 2. The UE-A may transmit information helpful for resource selection (e.g. inter-UE coordination information) to the UE-B. The UE-B may perform a resource sensing operation and/or resource selection operation for sidelink communication. The UE-B may perform the resource sensing and/or resource selection operation based on the inter-UE coordination information received from the UE-A.

Although FIG. 7 illustrates sidelink communication between one UE-A and one UE-B, the exemplary embodiment of FIG. 7 may be applied to sidelink communication between a plurality of UE-As (e.g. a UE-A group including one or more UE-As) and one UE-B, sidelink communication between a plurality of UE-Bs (e.g. a UE-B group including one or more UE-Bs) and one UE-A, and/or sidelink communication between a plurality of UE-As (e.g. UE-A group)

and a plurality of UE-Bs (e.g. UE-B group). In sidelink communication between a plurality of UE-As and one UE-B, one UE-B may transmit a plurality of first signaling messages to the plurality of UE-As, and may receive a second signaling message from each of the plurality of UE-As. In sidelink communication between one UE-A and a plurality of UE-Bs, one UE-A may receive a first signaling message from each of the plurality of UE-Bs, and transmit a second signaling message to each of the plurality of UE-Bs.

The UE-B may generate the first signaling message, which is a signal requesting provision of inter-UE coordination information, and transmit the first signaling message to the UE-A (S701). The step S701 may be performed when an explicit request procedure for inter-UE coordination information is enabled by higher layer signaling. The first signaling message may be a first-stage SCI and/or a second-stage SCI (e.g. SCI format 2-C). The first signaling message may be transmitted on a PSCCH and/or PSSCH. The first signaling message (e.g. first-stage SCI and/or second-stage SCI) may include a providing/requesting indicator indicating provision of or request for inter-UE coordination information. The size of the providing/requesting indicator may be 1 bit.

The providing/requesting indicator set to '0' may indicate that the corresponding SCI (e.g. SCI format 2-C) is used to provide inter-UE coordination information. The providing/requesting indicator set to '1' may indicate that the corresponding SCI (e.g. SCI format 2-C) is used to request inter-UE coordination information. In the step S701, the providing/requesting indicator included in the first signaling message may be set to 1, and in the step S702, the providing/requesting indicator included in the second signaling message may be set to 0. A reserved bit(s) in the first signaling message (e.g. first-stage SCI or second-stage SCI) may be used to express the providing/requesting indicator. Alternatively, a new first-stage SCI and/or a new second-stage SCI may be defined to request provision of inter-UE coordination information.

In addition, the first signaling message may further include a resource set type (e.g. type of resource information). The size of the resource set type may be 1 bit. The resource set type set to 0 may indicate a preferred resource set. In this case, the first signaling message may request provision of preferred resource set information (e.g. preferred resource information). The resource set type set to 1 may indicate a non-preferred resource set. In the instant case, the first signaling message may request provision of non-preferred resource set information (e.g. non-preferred resource information). According to a combination of the providing/requesting indicator and the resource set type included in the first signaling message, a request for inter-UE coordination information indicating a preferred resource set or a request for inter-UE coordination information indicating a non-preferred resource set may be indicated. In exemplary embodiments, a preferred resource set and preferred resources may be used with the same meaning, and a non-preferred resource set and non-preferred resources may be used with the same meaning.

The UE-A may receive the first signaling message (e.g. SCI format 2-C) from the UE-B and identify the providing/requesting indicator included in the first signaling message. If the providing/requesting indicator indicates a request for inter-UE coordination information, the UE-A may transmit a second signaling message including inter-UE coordination information to the UE-B (S702). The step S702 may be performed based on the UE-B's request for inter-UE coordination information. Alternatively, if an explicit request procedure for inter-UE coordination information is not enabled by higher layer signaling, the UE-A may transmit inter-UE coordination information to the UE-B without the UE-B's request for inter-UE coordination information. In the instant case, the UE-A may transmit inter-UE coordination information to the UE-B when a condition(s) configured by higher layer signaling is satisfied.

If the resource set type included in the first signaling message indicates a preferred resource set, the UE-A may determine a preferred resource set (e.g. preferred resources), and may generate inter-UE coordination information including information element(s) indicating the preferred resource set. The preferred resource set may be determined within a resource region (e.g. time resource, frequency resource, resource pool). The resource region within which the preferred resource set is determined may be configured to the UE(s) by higher layer signaling of the base station. Alternatively, information element(s) indicating the resource region within which the preferred resource set is determined may be included in the UE-B's first signaling message (e.g. SCI format 2-C). The time resource may be a resource reservation period. The frequency resource may be one or more subchannels.

If the resource set type included in the first signaling message indicates a non-preferred resource set, the UE-A may determine a non-preferred resource set (e.g. non-preferred resources), and may generate inter-UE coordination information including information element(s) indicating the non-preferred resource set. The non-preferred resource set may be determined within a resource region (e.g. time resource, frequency resource, resource pool). The resource region within which the non-preferred resource set is determined may be configured to the UE(s) by higher layer signaling of the base station. Alternatively, information element(s) indicating the resource region within which the non-preferred resource set is determined may be included in the UE-B's first signaling message (e.g. SCI format 2-C). The time resource may be a resource reservation section. The frequency resource may be one or more subchannels.

The second signaling message may include inter-UE coordination information including information element(s) indicating a preferred resource set or a non-preferred resource set. The second signaling message may be a first-stage SCI and/or a second-stage SCI (e.g. SCI format 2-C). The second signaling message may include the providing/requesting indicator indicating provision of inter-UE coordination information and the resource set type.

The UE-B may receive the second signaling message from the UE-A and identify the inter-UE coordination information included in the second signaling message. For example, if the providing/requesting indicator included in the second signaling message indicates provision of inter-UE coordination information, the UE-B may perform a decoding operation to obtain the inter-UE coordination information from the second signaling message. If the resource set type included in the second signaling message indicates a preferred resource set, the UE-B may determine that the inter-UE coordination information obtained from the second signaling message indicates a preferred resource type. If the resource set type included in the second signaling message indicates a non-preferred resource set, the UE-B may determine that the inter-UE coordination information obtained from the second signaling message indicates a non-preferred resource type. The UE-B may perform a resource sensing/selection operation by considering the inter-UE coordination information (S703). In exemplary embodiments, the resource sensing/selection operation may include a resource sensing operation and/or a resource selection operation.

The inter-UE coordination information may include information element(s) indicating a preferred resource set and/or a non-preferred resource set. The UE-B may select resource(s) within the preferred resource set by performing a resource sensing/selection operation, and perform sidelink communication using the selected resource(s). Alternatively, the UE-B may select resource(s) other than the non-preferred resource set by performing a resource sensing/selection operation, and perform sidelink communication using the selected resource(s).

The above-described first signaling message may include at least one of resource pool (RP) information, time resource information, or frequency resource information. The RP information may indicate a Tx RP allocated to the UE-B. The Tx RP of the UE-B may be configured by the base station. The time resource information may indicate a time resource sensed by the UE-B or a time resource reserved by the UE-B for data transmission. The time resource indicated by the time resource information may be a time resource within the Tx RP allocated to the UE-B. The UE-A can determine a preferred resource or non-preferred resource within the time resource indicated by the time resource information. The time resource information may indicate a resource reservation period.

The frequency resource information may indicate a frequency resource sensed by the UE-B or a frequency resource reserved by the UE-B for data transmission. The frequency resource indicated by the frequency resource information may be a frequency resource within the Tx RP allocated to the UE-B. The UE-B may determine a preferred resource or non-preferred resource within the frequency resource indicated by the frequency resource information. The frequency resource may be configured on a subchannel basis, and the frequency resource information may indicate the number of subchannels.

The first signaling message may include information element(s) indicating all or part of the resources sensed by the UE-B. The first signaling message may include information element(s) indicating all or part of the resources reserved by the UE-B. The resource information included in the first signaling message may indicate a resource region randomly selected by the UE-B. The resource information included in the first signaling message may indicate a resource region (e.g. resource window) in which the UE-B performs resource sensing/selection operations. The resource information included in the first signaling message may indicate a resource region preferred by the UE-B or a resource region not preferred by the UE-B.

The first signaling message may include one or more indication information defined in Table 3 below.

TABLE 3

| | First value | Second value |
|---|---|---|
| Indication information #1 | request | Non-request or provision |
| Indication information #2 | Inter-UE coordination scheme 1 | Inter-UE coordination scheme 2 |
| Indication information #3 (when indication information #2 is set to a first value) | Preferred resources | Non-preferred resources |
| Indication information #3 (when indication information #2 is set to a second value) | Expected/potential resource conflict | Detected resource conflict |

The size of each of the indication information #1,indication information #2,and indication information #3 may be 1 bit. The indication information #1,indication information #2,and indication information #3 may each have a first value or a second value. Each of the first value and the second value may be 0 or 1. For example, if the first value is 0, the second value may be 1. If the first value is 1, the second value may be 0. The indication information #1 may indicate whether the first signaling message (e.g. SCI format 2-C) including the corresponding indication information #1 is an inter-UE coordination request signal. The inter-UE coordination request signal may be a signal requesting inter-UE coordination information. Alternatively, the indication information #1 may indicate whether the first signaling message (e.g. SCI format 2-C) including the corresponding indication information #1 requests inter-UE coordination information. The indication information #1 set to the first value may indicate that the first signaling message transmitted by the UE-B is an inter-UE coordination request signal. The indication information #1 set to the second value may indicate that the first signaling message transmitted by the UE-B is not an inter-UE coordination request signal. The indication information #1 may be the above-described providing/requesting indicator. The indication information #2 may indicate use of an inter-UE coordination scheme 1 or inter-UE coordination scheme 2. The indication information #2 may be transmitted when both the inter-UE coordination scheme 1 and inter-UE coordination scheme 2 are available. Whether to use the inter-UE coordination scheme 1 and/or inter-UE coordination scheme 2 may be configured by higher layer signaling. When only one of the inter-UE coordination scheme 1 and inter-UE coordination scheme 2 is available or when one of the inter-UE coordination scheme 1 and inter-UE coordination scheme 2 is configured to be used, the indication information #2 may not be transmitted. The inter-UE coordination scheme 1 may be used to indicate preferred resources (e.g. preferred resource set) or non-preferred resources (e.g. non-preferred resource set). The inter-UE coordination scheme 2 may be used to indicate an expected/potential resource conflict or detected resource conflict. The indication information #2 set to the first value may indicate use (or request) of the inter-UE coordination scheme 1. The indication information #2 set to the second value may indicate use (or request) of the inter-UE coordination scheme 2.

When there are multiple types of inter-UE coordination information that UE-B can request (e.g. when there are multiple resource types (e.g. resource set types) that can be indicated by inter-UE coordination information), the indication information #3 may be used to indicate a request for one inter-UE coordination information (e.g. one resource type, one resource set type). The indication information #3 may indicate inter-UE coordination information according to the inter-UE coordination scheme indicated by the indication information #2. When the indication information #2 is set to the first value, the indication information #3 set to the first value may indicate a request for preferred resources (e.g. preferred resource set), and the indication information #3 set to the second value may indicate a request for non-preferred resources (e.g. non-preferred resource set).

When the indication information #2 is set to the second value, the indication information #3 set to the first value may indicate a request for expected/potential resource conflict information, and the indication information #3 set to the second value may indicate a request for detected resource conflict information. When the indication information #2 is not used, the indication information #3 may indicate a request for inter-UE coordination information (e.g. preferred resource set or non-preferred resource set) according to the inter-UE coordination scheme 1. The indication information #3 may be the resource set type described above.

The first signaling message may include information on a resource used by the UE-A for transmission of inter-UE coordination information. The first signaling message may include some indication information defined in Table 3. All or part of the indication information defined in Table 3 may be configured by higher layer signaling, MAC signaling, or PHY signaling. All or part of the indication information defined in Table 3 may be operated as fixed configuration.

If the first signaling message does not include resource information, a resource region for which inter-UE coordination information is requested according to the inter-UE coordination scheme may be a resource pool (RP) configured by at least one of higher layer signaling, MAC signaling, or PHY signaling. The RP may be a Tx RP allocated to the UE-B. The resource region (e.g. RP) for which inter-UE coordination information is requested may mean a resource region within which preferred resource, non-preferred resource, expected/potential resource conflict, and/or detected resource conflict is determined. That is, the UE-A may determine preferred resources or non-preferred resources within the resource region for which inter-UE coordination information is requested. In addition, the UE-A may identify occurrence of an expected/potential resource conflict or detected resource conflict within the resource region for which inter-UE coordination information is requested. In exemplary embodiments, information on the Tx RP for the UE-B may be assumed to be configured to the UE-A, and an Rx RP of the UE-A may be assumed to include the Tx RP of the UE-B.

Figure 8:
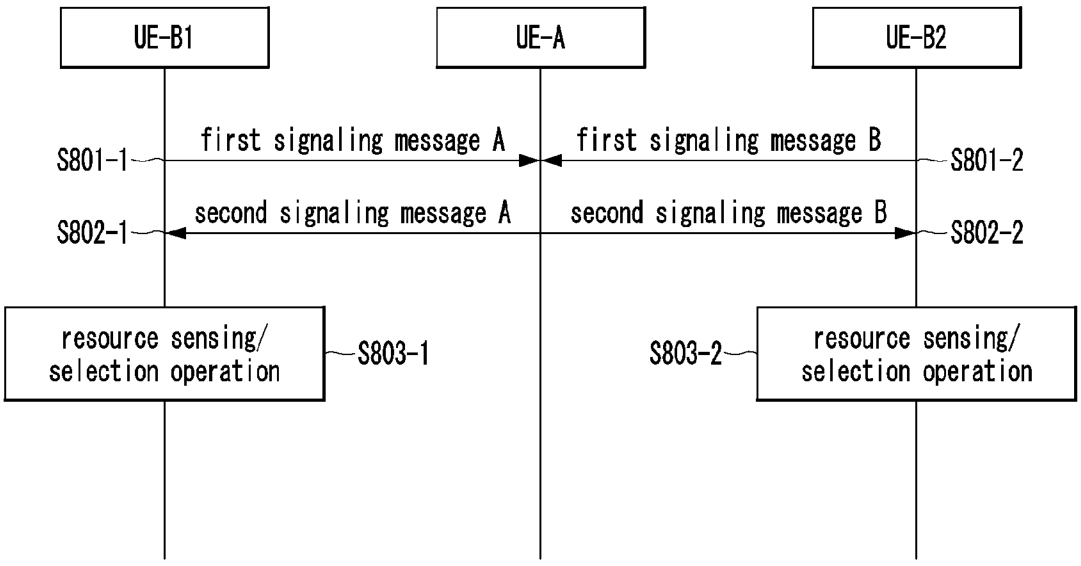
FIG. 8 is a sequence chart illustrating various exemplary embodiments of a sidelink communication method.

FIG. 8 is a sequence chart illustrating a second exemplary embodiment of a sidelink communication method.

As shown in FIG. 8, a communication system may include a UE-A, UE-B1, and UE-B2. The UE-B1 and UE-B2 may each transmit a first signaling message indicating a request for transmission of inter-UE coordination information to the UE-A (S801-1, S801-2). The UE-A may receive the first signaling message from each of the UE-B1 and UE-B2. The first signaling message transmitted by the UE-B1 may be referred to as a first signaling message A, and the first signaling message A may indicate a request for transmission of inter-UE coordination information A. The first signaling message transmitted by the UE-B2 may be referred to as a first signaling message B, and the first signaling message B may indicate a request for transmission of inter-UE coordination information B. In exemplary embodiments, the first signaling message may be used with a meaning of including the first signaling messages A and B. Each of the first signaling messages A and B may include the indication information #1, indication information #2, and/or indication information #3 defined in Table 3.

In addition, each of the first signaling messages A and B may include resource information. A resource region indicated by the resource information (e.g. resource information A) included in the first signaling message A may overlap a resource region indicated by the resource information (e.g. resource information B) included in the first signaling message B. For example, the resource region indicated by the resource information included in the first signaling message A may be the same as the resource region indicated by the resource information included in the first signaling message B. Alternatively, the resource region indicated by the resource information included in the first signaling message A may be different from the resource region indicated by the resource information included in the first signaling message B. Each of the first signaling messages A and B may include information indicating the type of resource information. The type of resource information may indicate resources sensed by the UE-B or resources reserved for data transmission of the UE-B. In exemplary embodiments, resources reserved for data transmission may be referred to as reserved resources.

The UE-A may identify information element(s) included in the first signaling message A and/or B (e.g. indication information #1, indication information #2, indication information #3, resource information, and/or type of the resource information), generate inter-UE coordination information based on the information element(s), and transmit a second signaling message including the inter-UE coordination information to each of the UE-B1 and the UE-B2 (S802-1, S802-2). The second signaling message transmitted to the UE-B1 may be referred to as a second signaling message A, and the second signaling message A may include inter-UE coordination information A. The second signaling message transmitted to the UE-B2 may be referred to as a second signaling message B, and the second signaling message B may include inter-UE coordination information B. The inter-UE coordination information A may be different from the inter-UE coordination information B. Alternatively, the inter-UE coordination information A and the inter-UE coordination information B may be the same. In exemplary embodiments, the second signaling message may be used with a meaning of including the second signaling messages A and B.

The UE-A may identify preferred resources, non-preferred resources, expected/potential resource conflict, or detected resource conflict within the resource region (e.g. sensed resources or reserved resources) indicated by the first signaling message, according to the inter-UE coordination scheme, and transmit a second signaling message including inter-UE coordination information indicating the identified information to each of the UE-B1 and UE-B2. In the above-described operations, a priority between the first signaling messages may be considered. The UE-B1 may receive the second signaling message A from the UE-A and perform a resource sensing/selection operation based on the inter-UE coordination information A included in the second signaling message A (S803-1). The UE-B1 may perform sidelink communication using resources determined in the step S803-1. The UE-B2 may receive the second signaling message B from the UE-A and perform a resource sensing/selection operation based on the inter-UE coordination information B included in the second signaling message B (S803-2). The UE-B2 may perform sidelink communication using resources determined in the step S803-2.

Depending on whether resource information is included in the first signaling message and/or the type of resource information included in the first signaling message, exemplary embodiments may be classified as shown in Table 4 below.

TABLE 4

| | Description |
|---|---|
| Exemplary embodiment #1 | The first signaling message does not include resource information. |
| Exemplary embodiment #2 | The first signaling message includes resource information, but does not indicate the type of resource information. |
| Exemplary embodiment #3 | The first signaling message includes resource information, and indicates the type of resource information. |

In Table 4, the resource information may indicate resources (e.g. resource region) for which inter-UE coordination information requested by the first signaling message is determined. In the exemplary embodiment #2, the first signaling message may provide information on a specific resource region, without distinction as to the type of resource information included in the first signaling message. For example, in the exemplary embodiment #2, the type of resource information may not be classified into sensed resources or reserved resources.

For example, in the exemplary embodiment #2, there may be two types of resource information included in the first signaling message. In the instant case, the type of resource information included in the first signaling message may be classified into sensed resources or reserved resources. In exemplary embodiments, the sensed resources may be candidate resource(s) determined by the resource sensing operation performed in the UE-B, and the candidate resource(s) may be used for data transmission. The reserved resources may refer to resources reserved by the UE-B for data transmission. In exemplary embodiments, resources may mean a resource region. For example, sensed resources may be interpreted as a sensed resource region, and reserved resources may be interpreted as a reserved resource region. Exemplary embodiments will be described based on a case where there are two types of resource information, but may also be applied when there are three or more types of resource information.

In the exemplary embodiment of FIG. 8, when the first signaling message A and the second signaling message B indicate the same resource region, the UE-A may transmit a second signaling message including the same inter-UE coordination information for the same resource region to each of the UE-B1 and UE-B2. That is, the second signaling messages A and B may include the same inter-UE coordination information. In the instant case, the UE-B1 and UE-B2 may transmit data using the same resource, and thus a transmission conflict may occur.

In the exemplary embodiment of FIG. 8, combinations according to whether or not resource information is included in each of the first signaling messages A and B may be as shown in Table 5 below.

TABLE 5

| | First signaling message A | First signaling message B |
|---|---|---|
| Case #1 | Resource information not included | Resource information not included |
| Case #2 | Resource information included | Resource information included |
| Case #3 | Resource information included | Resource information not included |
| Case #4 | Resource information not included | Resource information included |

When a plurality of first signaling messages are received, the UE-A may select one first signaling message (e.g. first signaling message with a higher priority) among the plurality of first signaling messages based on priorities, and may generate and transmit a second signaling message for the one first signaling message. When resource regions indicated by the plurality of first signaling messages are the same or when resource regions indicated by the plurality of first signaling messages partially overlap, the UE-A may select one first signaling message by considering priorities of the plurality of first signaling messages. In each of Cases #3 and #4, the UE-A may generate and transmit a second signaling message based on the priorities of the first signaling messages. For example, a priority of a first signaling message including resource information may be higher than a priority of a first signaling message not including resource information. In each of Cases #3 and #4, the UE-A may operate as follows.

The UE-A may generate and transmit a second signaling message for the first signaling message including resource information. In Case #3, the UE-A may generate inter-UE coordination information based on the resource information included in the first signaling message A, and transmit a second signaling message A including the inter-UE coordination information to the UE-B1. In the instant case, the UE-A may not generate a second signaling message B for the first signaling message B that does not include resource information. That is, the second signaling message B may not be transmitted to the UE-B2. Alternatively, even in Case #3, the UE-A may transmit the second signaling message B to the UE-B2.

In Case #4, the UE-A may generate inter-UE coordination information based on the resource information included in the first signaling message B, and transmit a second signaling message B including the inter-UE coordination information to the UE-B2. In the instant case, the UE-A may not generate a second signaling message A for the first signaling message A that does not include resource information. That is, the second signaling message A may not be transmitted to the UE-B1. Alternatively, even in Case #3, the UE-A may transmit the second signaling message A to the UE-B1.

In each of Cases #3 and #4, when the second signaling message for the first signaling message including resource information includes preferred resource information or non-conflicting resource information, the preferred resource information may be configured as non-preferred resource information in inter-UE coordination information (e.g. inter-UE coordination information for a first signaling message with a lower priority) transmitted to another UE-B, and the non-conflicting resource information may be configured as conflicting resource information in inter-UE coordination information (e.g. inter-UE coordination information for a first signaling message with a lower priority) transmitted to another UE-B. The non-conflicting resource information may indicate that a resource conflict does not occur, and conflicting resource information may indicate that a resource conflict occurs. The conflicting resource information may mean expected/potential resource conflict information or detected resource conflict information.

In each of Cases #1 and #2, even if preferred resources or non-conflicting resources exist in an overlapping resource region (e.g. the same resource region) for the first signaling messages A and B, the UE-A may transmit a second signaling message including non-preferred resource information or expected/potential resource conflict information to each of the UE-B1 and UE-B2. Since a transmission conflict may occur between the UE-B1 and UE-B2 in the same resource region, preferred resources within the same resource region may be indicated to the UE-B1 and UE-B2 as non-preferred resources, and non-conflicting resources within the same resource region may be indicated to the UE-B1 and UE-B2 as conflicting resources.

If the resource region is preferred resources or non-conflicting resources, one inter-UE coordination information may include preferred resource information or non-conflicting resource information, and the remaining inter-UE coordination information may include non-preferred resource information or conflicting resource information (e.g. expected/potential resource conflict information or detected resource conflict information). For example, inter-UE coordination information included in the second signaling message A (e.g. second signaling message A associated with a first signaling message A with a higher priority) may indicate preferred resources or non-conflicting resources, and inter-UE coordination information included in the second signaling message B (e.g. second signaling message B associated with a first signaling message B with a lower priority) may indicate non-preferred resources or conflicting resources.

In the exemplary embodiment of FIG. 8, combinations according to whether resource information is included and the type of resource information in each of the first signaling messages A and B may be as shown in Table 6 below.

TABLE 6

| | First signaling message A | First signaling message B |
|---|---|---|
| Case #1 | Resource information not included | Resource information not included |
| Case #2-1 | Resource information included (sensed resource information) | Resource information included (sensed resource information) |
| Case #2-2 | Resource information included (reserved resource information) | Resource information included (reserved resource information) |
| Case #2-3 | Resource information included (sensed resource information) | Resource information included (reserved resource information) |
| Case #2-4 | Resource information included (reserved resource information) | Resource information included (sensed resource information) |
| Case #3-1 | Resource information included (sensed resource information) | Resource information not included |
| Case #3-2 | Resource information included (reserved resource information) | Resource information not included |
| Case #4-1 | Resource information not included | Resource information included (sensed resource information) |
| Case #4-2 | Resource information not included | Resource information included (reserved resource information) |

If the types of resource information included in the first signaling message are differentiated, the UE-A may generate and transmit a second signaling message based on priorities according to the types of resource information. A priority of a first signaling message including resource information may be higher than a priority of a first signaling message not including resource information. A priority of a first signaling message including reserved resource information may be higher than a priority of a first signaling message including sensed resource information. Conversely, a priority of a first signaling message including sensed resource information may be higher than a priority of a first signaling message including reserved resource information. The priority-based generation/transmission operation of the second signaling message may be performed when resource regions indicated by a plurality of first signaling messages are the same or when resource regions indicated by a plurality of first signaling messages partially overlap.

In each of Cases #2-3 and #2-4 of Table 6, the UE-A may operate as follows. When a priority of a first signaling message including reserved resource information is higher than a priority of a first signaling message including sensed resource information, the UE-A may generate and transmit a second signaling message for the first signaling message including reserved resource information. In Case #2-3, the UE-A may generate inter-UE coordination information based on the reserved resource information included in the first signaling message B, and may transmit a second signaling message B including the inter-UE coordination information. In the instant case, the UE-A may not generate the second signaling message A for the first signaling message A including sensed resource information. That is, the second signaling message A may not be transmitted. Alternatively, the UE-A may generate and transmit the second signaling message A for the first signaling message A including sensed resource information.

In Case #2-4, the UE-A may generate inter-UE coordination information based on the reserved resource information included in the first signaling message A, and transmit the second signaling message A including the inter-UE coordination information. In the instant case, the UE-A may not generate a second signaling message B for the first signaling message B including sensed resource information. That is, the second signaling message B may not be transmitted. Alternatively, the UE-A may generate and transmit the second signaling message B for the first signaling message B including sensed resource information.

In each of Cases #2-3 and #2-4 of Table 6, when the second signaling message for the first signaling message including reserved resource information includes preferred resource information or non-conflicting resource information, the preferred resource information may be configured as non-preferred resource information in inter-UE coordination information transmitted to another UE-B (e.g. inter-UE coordination information for a first signaling message with a lower priority), and non-conflicting resource information may be configured as conflicting resource information in inter-UE coordination information transmitted to another UE-B (e.g. inter-UE coordination information for a first signaling message with a lower priority).

In Cases #3-1 to #4-2 of Table 6, resource information may be included in only one first signaling message. The UE-A may generate and transmit a second signaling message for the first signaling message including resource information. In each of Cases #3-1 and #3-2, the UE-A may generate inter-UE coordination information based on the resource information (e.g. sensed resource information or reserved resource information) included in the first signaling message A, and transmit the second signaling message A including the inter-UE coordination information. In the instant case, the UE-A may not generate the second signaling message B for the first signaling message B that does not include resource information. That is, the second signaling message B may not be transmitted. Alternatively, the UE-A may generate and transmit the second signaling message B for the first signaling message B that does not include resource information.

In each of Cases #4-1 and #4-2, the UE-A may generate inter-UE coordination information based on resource information (e.g. sensed resource information or reserved resource information) included in the first signaling message B, and transmit the second signaling message B including the inter-UE coordination information. In the instant case, the UE-A may not generate the second signaling message A for the first signaling message A that does not include resource information. That is, the second signaling message A may not be transmitted. Alternatively, the UE-A may generate and transmit the second signaling message A for the first signaling message A that does not include resource information.

In Cases #3-1 to #4-2 of Table 6, the second signaling message for the first signaling message including resource information (e.g. reserved resource information or sensed resource information) includes preferred resource information or non-conflicting resource information, the preferred resource information may be configured as non-preferred resource information in inter-UE coordination information transmitted to another UE-B (e.g., inter-UE coordination information for a first signaling message with a lower priority), and the non-conflicting resource information may be configured as conflicting resource information in inter-UE coordination information transmitted to another UE-B (e.g. inter-UE coordination information for a first signaling message with a lower priority).

In Cases #1 to #2-2 of Table 6, even if preferred resources or non-conflicting resources exist in an overlapping resource region (e.g. the same resource region) for the first signaling messages A and B, the UE-A may transmit a second signaling message including non-preferred resource information or expected/potential resource conflict information to each of the UE-B1 and UE-B2. Since a transmission conflict may occur between the UE-B1 and UE-B2 in the same resource region, preferred resources within the same resource region may be indicated to the UE-B1 and UE-B2 as non-preferred resources, and non-conflicting resources within the same resource region may be indicated to the UE-B1 and UE-B2 as conflicting resources.

If the resource region is preferred resources or non-conflicting resources, one inter-UE coordination information may include preferred resource information or non-conflicting resource information, and the remaining inter-UE coordination information may include non-preferred resource information or conflicting resource information (e.g. expected/potential resource conflict information or detected resource conflict information). For example, inter-UE coordination information included in the second signaling message A (e.g. second signaling message A associated with a first signaling message A having a higher priority) may indicate preferred resources or non-conflicting resources, and inter-UE coordination information included in the second signaling message B (e.g. second signaling message B associated with a first signaling message B having a lower priority) may indicate non-preferred resources or conflicting resources.

Meanwhile, the size of the resources indicated by the resource information included in the first signaling message may be configured variously. For example, the size of the resources indicated by the resource information may be classified into two types. The size of the resources may mean the size of time resources and/or the size of frequency resources. The size of the resources may not be a fixed size but may mean a range of time resources and/or a range of frequency resources. The size of the resources may be classified into a resource size X and a resource size Y. Each of the resource sizes X and Y may indicate a resource range. The resource size X may be smaller than the resource size Y. For example, the resource size X may be equal to or less than 10 resource blocks (RBs), and the resource size Y may exceed 10 RBs.

In the exemplary embodiment of FIG. 8, combinations of whether resource information is included and the size of the resource information in each of the first signaling messages A and B may be as shown in Table 7 below.

TABLE 7

| | First signaling message A | First signaling message B |
|---|---|---|
| Case #1 | Resource information not included | Resource information not included |
| Case #2-1 | Resource information included (Resource size Y) | Resource information included (Resource size Y)) |
| Case #2-2 | Resource information included (Resource size X) | Resource information included (Resource size X) |
| Case #2-3 | Resource information included (Resource size Y) | Resource information included (Resource size X) |
| Case #2-4 | Resource information included (Resource size X) | Resource information included (Resource size Y) |
| Case #3-1 | Resource information included (Resource size Y) | Resource information not included |
| Case #3-2 | Resource information included (Resource size X) | Resource information not included |
| Case #4-1 | Resource information not included | Resource information included (Resource size Y) |
| Case #4-2 | Resource information not included | Resource information included (Resource size X) |

If the sizes of resource information included in the first signaling message are differentiated, the UE-A may generate and transmit a second signaling message based on priorities according to the sizes of the resource information. A priority of a first signaling message including resource information having a smaller size or smaller range may be higher than a priority of a first signaling message having a larger size or larger range. Since an RP-based operation is performed when a first signaling message does not include resource information, the first signaling message that does not include resource information may be regarded as a first signal message including resource information with the largest size or largest range. That is, the first signaling message that does not include resource information may be determined to have a lower priority. Conversely, a priority of a first signaling message including resource information having a larger size or larger range may be higher than a priority of a first signaling message having a smaller size or smaller range. The priority-based generation/transmission operation of the second signaling message may be performed when resource regions indicated by a plurality of first signaling messages is the same or when resource regions indicated by a plurality of first signaling messages partially overlap.

In each of Cases #2-3 and #2-4 of Table 7, the UE-A may operate as follows. When a priority of a first signaling message including resource information with a smaller size (e.g. resource size X) is higher than a priority of a first signaling message including resource information having a larger size (e.g. resource size Y), the UE-A may generate and transmit a second signaling message for the first signaling message including resource information having a smaller size. In Case #2-3, since the size of the resources indicated by the first signaling message B is smaller than the size of the resources indicated by the first signaling message A, the UE-A may generate inter-UE coordination information based on the resource information included in the first signaling message B, and transmit the second signaling message B including the inter-UE coordination information. In the instant case, the UE-A may not generate the second signaling message A for the first signaling message A. That is, the second signaling message A may not be transmitted. Alternatively, the UE-A may generate and transmit the second signaling message A for the first signaling message A.

In Case #2-4, since the size of the resources indicated by the first signaling message A is smaller than the size of the resources indicated by the first signaling message B, the UE-A may generate inter-UE coordination information based on the resource information included in the first signaling message A, and transmit the second signaling message A including the inter-UE coordination information. In the instant case, the UE-A may not generate the second signaling message B for the first signaling message B. That is, the second signaling message B may not be transmitted. Alternatively, the UE-A may generate and transmit the second signaling message B for the first signaling message B.

In each of Cases #2-3 and #2-4 of Table 7, when the second signaling message for the first signaling message including resource information includes preferred resource information or non-conflicting resource information, the preferred resource information may be configured as non-preferred resource information in inter-UE coordination information transmitted to another UE-B (e.g. inter-UE coordination information for a first signaling message with a lower priority), and the non-conflicting resource information may be configured as conflicting resource information in inter-UE coordination information transmitted to another UE-B (e.g. inter-UE coordination information for a first signaling message with a lower priority).

In cases #3-1 to #4-2 of Table 7, resource information may be included in only one first signaling message. Since a first signaling message that does not include resource information is considered to indicate resources having the largest size, the UE-A may generate and transmit a second signaling message for the first signaling message including resource information. In each of Cases #3-1 and #3-2, the UE-A may generate inter-UE coordination information based on the resource information included in the first signaling message A, and transmit the second signaling message A including the inter-UE coordination information. In the instant case, the UE-A may not generate the second signaling message B for the first signaling message B that does not include resource information. That is, the second signaling message B may not be transmitted. Alternatively, the UE-A may generate and transmit the second signaling message B for the first signaling message B that does not include resource information.

In each of Cases #4-1 and #4-2, the UE-A may generate inter-UE coordination information based on resource information included in the first signaling message B, and transmit the second signaling message B including the inter-UE coordination information. In the instant case, the UE-A may not generate the second signaling message A for the first signaling message A that does not include resource information. That is, the second signaling message A may not be transmitted. Alternatively, the UE-A may generate and transmit the second signaling message A for the first signaling message A that does not include resource information.

In Cases #3-1 to #4-2 of Table 7, the second signaling message for the first signaling message including resource information includes preferred resource information or non-conflicting resource information, the preferred resource information may be configured as non-preferred resource information in inter-UE coordination information transmitted to another UE-B (e.g. inter-UE coordination information for a first signaling message with a lower priority), and the non-conflicting resource information may be configured as conflicting resource information in inter-UE coordination information transmitted to another UE-B (e.g. inter-UE coordination information for a first signaling message with a lower priority).

In Cases #1 to #2-2 of Table 7, even if preferred resources or non-conflicting resources exist in an overlapping resource region (e.g. the same resource region) for the first signaling messages A and B, the UE-A may transmit a second signaling message including non-preferred resource information or expected/potential resource conflict information to each of the UE-B1 and UE-B2. Since a transmission conflict may occur between the UE-B1 and UE-B2 in the same resource region, preferred resources within the same resource region may be indicated to the UE-B1 and UE-B2 as non-preferred resources, and non-conflicting resources within the same resource region may be indicated to the UE-B1 and UE-B2 as conflicting resources.

If the resource region is preferred resources or non-conflicting resources, one inter-UE coordination information may include preferred resource information or non-conflicting resource information, and the remaining inter-UE coordination information may include non-preferred resource information or conflicting resource information (e.g. expected/potential resource conflict information or detected resource conflict information). For example, inter-UE coordination information included in the second signaling message A (e.g. second signaling message A associated with a first signaling message A with a higher priority) may indicate preferred resources or non-conflicting resources, and inter-UE coordination information included in the second signaling message B (e.g. second signaling message B associated with a first signaling message B with a lower priority) may indicate non-preferred resources or conflicting resources.

The above-described exemplary embodiments may be applied to a scenario in which the UE-A receives two or more first signaling messages, a scenario in which two or more types of resource information are used, and/or a scenario in which the sizes of resources indicated by resource information are classified into two or more sizes.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of a first user equipment (UE), the method comprising:

receiving, by a processor, from a second UE, a first signaling including a first indicator indicating whether the first signaling is used for requesting first inter-UE coordination (IUC) information;

receiving, by the processor, from a third UE, a second signaling including a second indicator indicating whether the second signaling is used for requesting second IUC information;

identifying, by the processor, a first priority indicated by the first signaling and a second priority indicated by the second signaling based on the first indicator indicating the first signaling being used for requesting the first IUC information and the second indicator indicating the second signaling being used for requesting the second IUC information;

based on the first priority being higher than the second priority:

generating, by the processor, the first IUC information based on the first signaling; and transmitting, by the processor to the second UE, a third signaling including the first IUC information.

2. The method of claim 1, wherein the generating the first IUC information comprises:

determining, by the processor, at least one non-preferred resource within a resource region indicated by the first signaling; and generating, by the processor, the first IUC information for informing the as least one non-preferred resources to the second UE.

3. The method of claim 1, wherein the first priority is higher than the second priority based on the first singling including sensed resource information while the second signaling including reserved resource information.

4. The method of claim 1, wherein the first priority is higher than the second priority based on the first singling including reserved resource information while the second signaling including sensed resource information.

5. The method of claim 1, wherein the first signaling includes first resource information and the second signaling includes second resource information, and wherein the first priority is higher than the second priority based on a first resource size informed by the first resource information being smaller than a second resource size informed by the second resource information.

6. The method of claim 1, wherein the first priority is higher than the second priority based on the first signaling including first resource information while the second signaling including no resource information.

7. The method of claim 1, wherein the identifying the first priority and the second priority comprises:

identifying the first priority and the second priority based on a resource region indicated by the first signaling being at least partially overlapped with a resource region indicated by the second signaling.

8. The method of claim 1, wherein the second IUC information corresponding to the second signaling is not transmitted.

9. The method of claim 1, further comprising:

determining, by the processor, at least one resource based on the first signaling and the second signaling;

generating, by the processor, the second IUC information based on the second signaling; and transmitting, by the processor to the third UE, a fourth signaling including the second IUC information, wherein the first IUC information includes resource information informing the at least one resource as a preferred resource, and wherein the second IUC information includes resource information informing the at least one resource as a non-preferred resource.

10. A first user equipment (UE) comprising:

a transceiver;

a processor; and a memory storing one or more instructions executable by the processor, wherein the one or more instructions are executed by the processor to perform:

receiving, through the transceiver from a second UE, a first signaling including a first indicator indicating whether the first signaling is used for requesting first inter-UE coordination (IUC) information;

receiving, through the transceiver from a third UE, a second signaling including a second indicator indicating whether the second signaling is used for requesting second IUC information;

identifying a first priority indicated by the first signaling and a second priority indicated by the second signaling based on the first indicator indicating the first signaling being used for requesting the first IUC information and the second indicator indicating the second signaling being used for requesting the second IUC information;

based on the first priority being higher than the second priority:

generating the first IUC information based on the first signaling; and transmitting, through the transceiver to the second UE, a third signaling including the first IUC information.

11. The first UE of claim 10, wherein the generating the first IUC information comprises:

determining, by the processor, at least one non-preferred resource within a resource region indicated by the first signaling; and generating, by the processor, the first IUC information for informing the as least one non-preferred resources to the second UE.

12. The first UE of claim 10, wherein the first priority is higher than the second priority based on the first singling including sensed resource information while the second signaling including reserved resource information.

13. The first UE of claim 12, wherein the first priority is higher than the second priority based on the first singling including reserved resource information while the second signaling including sensed resource information.

14. The first UE of claim 10, wherein the first signaling includes first resource information and the second signaling includes second resource information, and wherein the first priority is higher than the second priority based on a first resource size informed by the first resource information being smaller than a second resource size informed by the second resource information.

15. The first UE of claim 10, wherein the first priority is higher than the second priority based on the first signaling including first resource information while the second signaling including no resource information.

16. The first UE of claim 10, wherein the identifying the first priority and the second priority comprises:

identifying the first priority and the second priority based on a resource region indicated by the first signaling being at least partially overlapped with a resource region indicated by the second signaling.

17. The first UE of claim 10, wherein the second IUC information corresponding to the second signaling is not transmitted.

18. The first UE of claim 10, wherein the one or more instructions are further executed to perform:

determining, by the processor, at least one resource based on the first signaling and the second signaling;

generating, by the processor, the second IUC information based on the second signaling; and transmitting, by the processor to the third UE, a fourth signaling including the second IUC information, wherein the first IUC information includes resource information informing the at least one resource as a preferred resource, and wherein the second IUC information includes resource information informing the at least one resource as a non-preferred resource.

* * * * *